United States Patent
Guo et al.

(10) Patent No.: US 10,854,017 B2
(45) Date of Patent: Dec. 1, 2020

(54) THREE-DIMENSIONAL VIRTUAL IMAGE DISPLAY METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Jinhui Guo, Shenzhen (CN); Hui Chen, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/541,620

(22) Filed: Aug. 15, 2019

(65) Prior Publication Data
US 2019/0371082 A1    Dec. 5, 2019

Related U.S. Application Data

(63) Continuation of application No. PCT/CN2018/101028, filed on Aug. 17, 2018.

(30) Foreign Application Priority Data

Aug. 17, 2017 (CN) .......................... 2017 1 0706915

(51) Int. Cl.
*G06T 19/20* (2011.01)
*G06T 15/50* (2011.01)

(52) U.S. Cl.
CPC ............ *G06T 19/20* (2013.01); *G06T 15/503* (2013.01); *G06T 15/506* (2013.01); *G06T 2219/012* (2013.01); *G06T 2219/2021* (2013.01)

(58) Field of Classification Search
CPC ..... G06T 19/20; G06T 15/503; G06T 15/506; G06T 2219/012; G06T 2219/2021; G06T 15/50
See application file for complete search history.

(56) References Cited

U.S. PATENT DOCUMENTS

2004/0239672 A1* 12/2004 Schmidt .................. G06T 15/80
                                                                      345/426
2013/0266213 A1* 10/2013 Yamashita ........... H04N 13/128
                                                                      382/154
(Continued)

FOREIGN PATENT DOCUMENTS

CN        101539804 A        9/2009
CN        102117500 A        7/2011
(Continued)

OTHER PUBLICATIONS

The World Intellectual Property Organization (WIPO) International Search Report for PCT/CN2018/101028 dated Nov. 9, 2018 5 Pages (including translation).

*Primary Examiner* — Xilin Guo
(74) *Attorney, Agent, or Firm* — Anova Law Group, PLLC

(57) ABSTRACT

A three-dimensional virtual image display method is provided for a terminal. The method includes obtaining a first model map and a second model map of a three-dimensional virtual image, and determining a target region of the three-dimensional virtual image. The three-dimensional virtual image comprises a first model and a second model, and the target region is a joining region of the first model and the second model. The method also includes setting brightness of each pixel point in the target region in a shader to be a same value, the shader being configured to set illumination environmental data of each pixel point in the three-dimensional virtual image and the illumination environmental data (Continued)

at least comprising the brightness; and rendering the first model map and the second model map through the shader, so that a brightness of each pixel point in the target region displayed after rendering is equal.

15 Claims, 7 Drawing Sheets

(56) References Cited

U.S. PATENT DOCUMENTS

| | | | | |
|---|---|---|---|---|
| 2014/0085293 | A1* | 3/2014 | Konoplev | A63F 13/10 |
| | | | | 345/419 |
| 2015/0235305 | A1* | 8/2015 | Reed | G06Q 30/0643 |
| | | | | 705/27.2 |
| 2019/0026954 | A1* | 1/2019 | Vats | G06T 11/001 |

FOREIGN PATENT DOCUMENTS

| | | | |
|---|---|---|---|
| CN | 103778538 | A | 5/2014 |
| CN | 105957018 | A | 9/2016 |

* cited by examiner

THREE-DIMENSIONAL VIRTUAL IMAGE DISPLAY METHOD AND APPARATUS, TERMINAL, AND STORAGE MEDIUM

RELATED APPLICATION

This application is a continuation application of PCT Patent Application No. PCT/CN2018/101028, filed on Aug. 17, 2018, which claims priority to Chinese Patent Application No. 201710706915.8, entitled "THREE-DIMENSIONAL VIRTUAL IMAGE DISPLAY METHOD, APPARATUS, TERMINAL, AND STORAGE MEDIUM" filed with the China National Intellectual Property Administration on Aug. 17, 2017, which is incorporated herein by reference in its entirety.

FIELD OF THE TECHNOLOGY

Embodiments of the present application relate to the technical field of virtual reality and, in particular, to a three-dimensional virtual image display method and apparatus, a terminal, and a storage medium.

BACKGROUND

With development of the virtual reality technology, the three-dimensional display technology is widely applied and can accurately simulate a real scenario by creating a three-dimensional virtual environment and three-dimensional virtual images of users, to bring an immersive experience for users.

In consideration of great facial differences of different users in real life, when a three-dimensional virtual image is created, a trunk model may be generated in advance, a head model is generated according to a facial image of a current user, and the head model and the trunk model are combined to form a complete three-dimensional virtual image. The trunk model is used to exhibit trunk actions of a human body and the head model is used to exhibit facial expressions or head actions.

However, when the trunk model and the head model are combined, obvious seams will appear in a joining region of the trunk model and the head model, resulting in poor display effects of the three-dimensional virtual image.

The disclosed methods and systems are directed to solve one or more problems set forth above and other problems.

SUMMARY

According to one aspect, a three-dimensional virtual image display method is provided for a terminal. The method includes obtaining a first model map and a second model map of a three-dimensional virtual image, and determining a target region of the three-dimensional virtual image. The three-dimensional virtual image comprises a first model and a second model, the first model map comprises texture data of each pixel point in the first model, and the second model map comprises texture data of each pixel point in the second model. The target region is a joining region of the first model and the second model. The method also includes setting brightness of each pixel point in the target region in a shader to be a same value, the shader being configured to set illumination environmental data of each pixel point in the three-dimensional virtual image and the illumination environmental data at least comprising the brightness; and rendering the first model map and the second model map through the shader, so that a brightness of each pixel point in the target region displayed after rendering is equal.

According to another aspect, a three-dimensional virtual image display apparatus is provided, and the apparatus includes a memory storing computer program instructions, and a processor coupled to the memory. When executing the computer program instructions, the processor is configured to perform: obtaining a first model map and a second model map of a three-dimensional virtual image, wherein the three-dimensional virtual image comprises a first model and a second model, the first model map comprises texture data of each pixel point in the first model, and the second model map comprises texture data of each pixel point in the second model; determining a target region of the three-dimensional virtual image, the target region being a joining region of the first model and the second model; setting brightness of each pixel point in the target region in a shader to be a same value, the shader being configured to set illumination environmental data of each pixel point in the three-dimensional virtual image and the illumination environmental data at least comprising the brightness; and rendering the first model map and the second model map through the shader, so that a brightness of each pixel point in the target region displayed after rendering is equal.

According to another aspect, a non-transitory computer-readable storage medium storing computer program instructions executable by at least one processor to perform: obtaining a first model map and a second model map of a three-dimensional virtual image, wherein the three-dimensional virtual image comprises a first model and a second model, the first model map comprises texture data of each pixel point in the first model, and the second model map comprises texture data of each pixel point in the second model; determining a target region of the three-dimensional virtual image, the target region being a joining region of the first model and the second model; setting brightness of each pixel point in the target region in a shader to be a same value, the shader being configured to set illumination environmental data of each pixel point in the three-dimensional virtual image and the illumination environmental data at least comprising the brightness; and rendering the first model map and the second model map through the shader, so that a brightness of each pixel point in the target region displayed after rendering is equal.

Regarding the method, the apparatus, the terminal, and the storage medium according to the embodiments of this application, a first model map and a second model map of a three-dimensional virtual image are obtained to determine a target region of the three-dimensional virtual image, brightness of each pixel point in the target region in a shader is set to be equal when the three-dimensional virtual image is displayed, and then rendering is performed, to ensure that brightness of pixel points in the target region is equal and the first model and the second model are transited naturally in the joining region without causing any seam, enhance display effects, further satisfy display demand of the three-dimensional virtual image, enhance realness of the three-dimensional virtual image, and bring immersive experience for a user.

The additional aspects and advantages of this application will be provided in the following description, and some will become apparent from the following description or understood through practice of this application.

BRIEF DESCRIPTION OF THE DRAWINGS

To describe the technical solutions in the embodiments of the present disclosure more clearly, the following briefly describes the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

The technical solutions in the embodiments of the present disclosure will be described in the following with reference to the accompanying drawings. It is obvious that the described embodiments are only some rather than all of the embodiments of the present disclosure. All other embodiments obtained by a person of ordinary skill in the art based on the embodiments of the present disclosure without creative efforts shall fall within the protection scope of the present disclosure.

Figure 1:
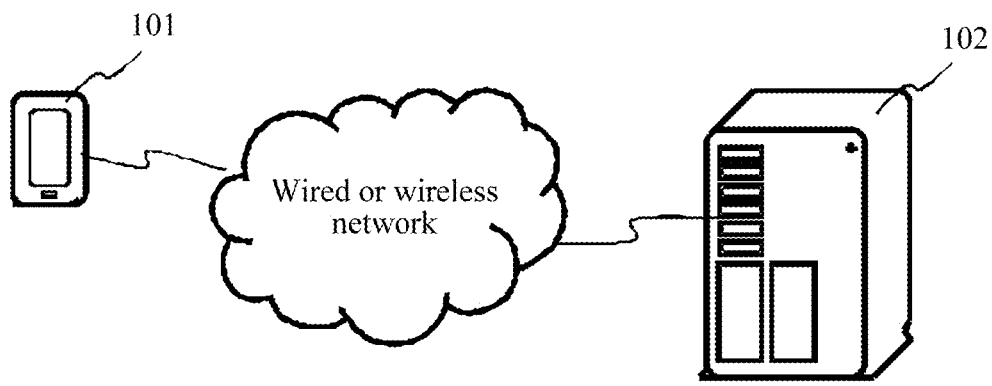
FIG. 1 is a schematic diagram of an implementation environment according to an embodiment of the present disclosure.

FIG. 1 is a schematic diagram of an implementation environment according to an embodiment of the present disclosure. The implementation environment includes a terminal 101 and a server 102. The terminal 101 is connected to the server 102 through a wired or wireless network.

The terminal 101 may be a terminal such as a mobile phone, a tablet computer, a desktop computer, or an electronic reader, and the server 102 may be a server that provides a background service for the terminal 101, and may be a server or a server cluster composed of a plurality of servers. In a possible implementation, the server 102 may be a background server of a client installed in the terminal 101.

In this embodiment of the present disclosure, the terminal 101 is a terminal supporting a three-dimensional virtual image generation function. In a possible implementation, a client may be installed in the terminal 101, the client supports the three-dimensional virtual image generation function, and the client may be a social application client or a game client, or any other client.

The three-dimensional virtual image refers to any three-dimensional image created for virtual reality application, which may be an image formed by combining two or more models. For example, an three-dimensional virtual image may be formed by combining a first model and a second model, where the first model and the second model are models of two parts required for forming a whole three-dimensional virtual image.

In certain embodiments, the first model is a head model and the second model is a trunk model, or the first model is a body model and the second model is a limb model. After generating the three-dimensional virtual image, the server may obtain a first model map and a second model map, and send the first model map and the second model map to the terminal 101, so that the terminal 101 performs rendering to display the three-dimensional virtual image.

For example, the first model is a head model and the second model is a trunk model, and the terminal 101 may have a camera function. After obtaining a facial image of a user through the camera function, the terminal 101 sends the facial image to the server 102. The server 102 generates a corresponding head model according to the facial image, combines the head model and the trunk model to form a three-dimensional virtual image, obtains a head model map and a trunk model map correspondingly, and send the head model map and the trunk mode map to the terminal 101, so that the terminal 101 performs rendering to display the three-dimensional virtual image.

Further, the wireless network or wired network may use a standard communications technology and/or protocol. The network is usually Internet or may be any combination of any other networks, including, but not limited to, a Local Area Network (LAN), a Metropolitan Area Network (MAN), a Wide Area Network (WAN), a mobile, wired, or wireless network, a private network, or a virtual private network. In some embodiments, a technology and/or a format including a Hyper Text Mark-up Language (HTML) and an Extensible Markup Language (XML) is used to represent data exchanged through a network. Furthermore, a common encryption technology, such as a Secure Socket Layer (SSL), Transport Layer Security (TLS), a Virtual Private Network (VPN), and Internet Protocol Security (IPsec), is used to encrypt all or some links. In other embodiments, a customized and/or a dedicated data communication technology may be used to replace or supplement the foregoing data communication technology.

In one embodiment of the present disclosure, an application scenario for displaying a three-dimensional virtual image is applied. For example, when a game player plays a game through a game client, each user may set a three-dimensional virtual image or set a three-dimensional virtual image in a social application client, to interact with other users.

Figure 2:
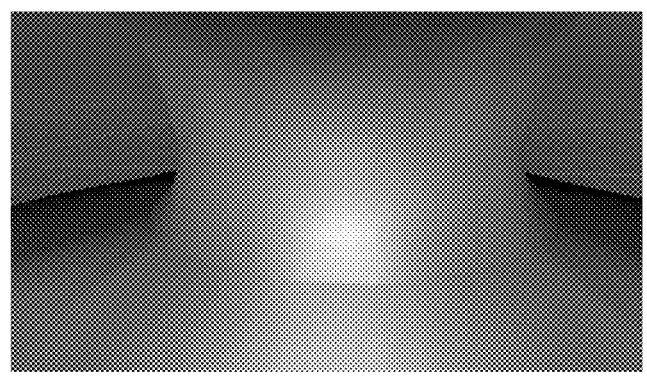
FIG. 2 is a schematic diagram of a three-dimensional virtual image according to the related technology.

In a related technology, when a head model and a trunk model are combined to form a three-dimensional virtual image, a display effect of a joining region of the head model and the trunk model is shown in FIG. 2. Referring to FIG. 2, the neck of the three-dimensional virtual image has an obvious seam and is significantly different from a real human body, resulting in a poor display effect and influencing user experience.

However, in one embodiment of the present disclosure, when a three-dimensional virtual image is displayed, rendering is performed after controlling illumination environmental data of a joining region, so as to ensure that the surface of the joining region is uniform, avoid appearance of seams, and improve the display effect.

Figure 3A:
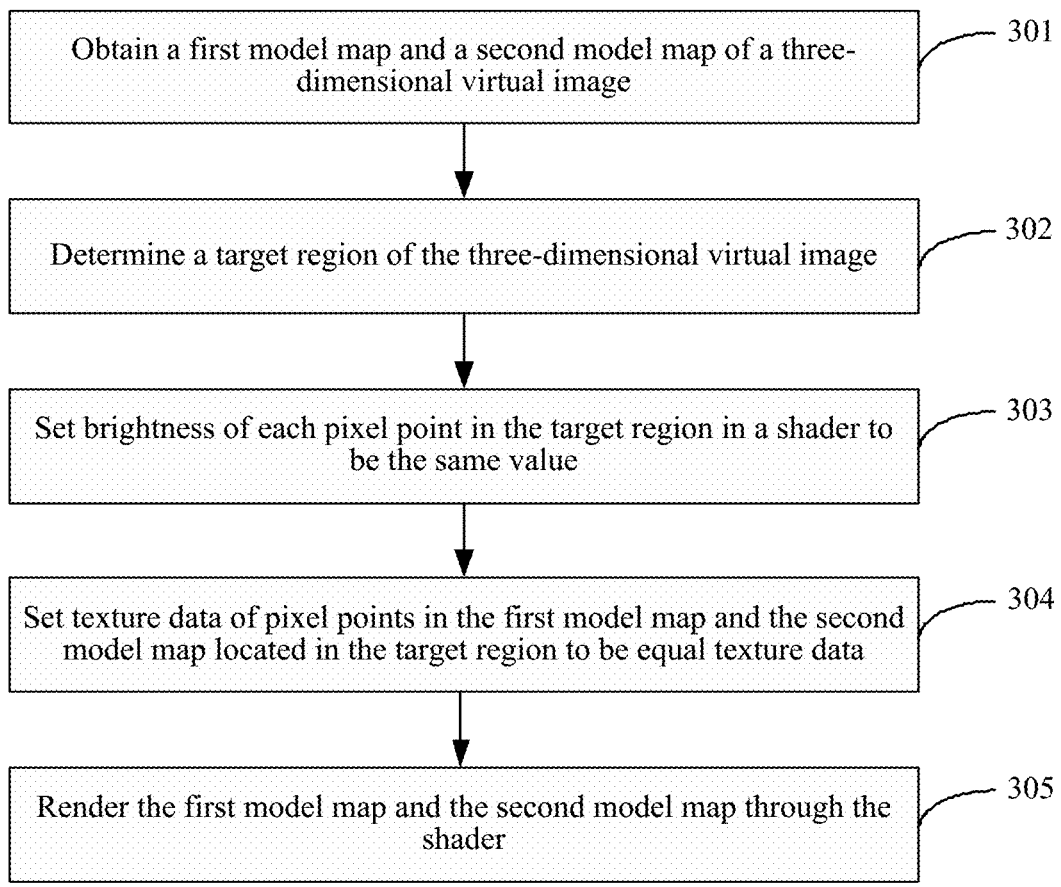
FIG. 3A is a flowchart of a three-dimensional virtual image display method according to an embodiment of the present disclosure.

FIG. 3A is a flowchart of a three-dimensional virtual image display method according to an embodiment of the present disclosure. The execution entity in one embodiment of the present disclosure is the terminal 101 in FIG. 1. Referring to FIG. 3A, the method includes the followings.

301: Obtaining a first model map and a second model map of a three-dimensional virtual image.

The three-dimensional virtual image includes a first model and a second model and is formed by combining the first model and the second model.

The terminal may obtain a three-dimensional virtual image, a first model map, and a second model map sent by other devices. Alternatively, a three-dimensional virtual image may also be generated according to a facial image of a current user. In a possible implementation, the first model is a head model and the second model is a trunk model. The terminal obtains a facial image, generates the first model according to the facial image, and combines the first model and the second model to form a three-dimensional virtual image. A first model map and a second model map of the three-dimensional virtual image are sent to the terminal from the server.

The facial image may be obtained through taking a picture of a face of a user of the terminal, the face of the first model matches the facial image provided by the user, so that the generated three-dimensional virtual image may represent the user and bring immersive experience to the user.

When the facial image is taken, the terminal opens a shooting interface, in which a baseline of a preset part of the facial image is displayed. The baseline is used to prompt to adjust the preset part in a preview image to a position of the baseline. Optionally, the shooting interface may further include text prompt information for prompting to adjust the preset part to the position of the baseline. For example, the terminal may display, in the shooting interface, a baseline of an eye part and a nose and text prompt information "click to shoot after aligning the eyes and nose with the base line".

Optionally, to enhance accuracy and obtain a more real facial image, the terminal may, in cooperation with the user, take pictures of the user from different shooting angles, to obtain a plurality of facial images, for example, a forward image, a left image, and a right image of the face. When the terminal sends a three-dimensional virtual generation request to the server, the three-dimensional virtual generation request may include a plurality of facial images, and the server may generate the first model according to the plurality of facial images.

In addition, the facial images may also be selected by the user from pictures stored in a gallery or obtained in another manner.

After the facial image is obtained, beautification processing may be performed on the facial image. Optionally, feature recognition is performed on the facial image, to obtain a plurality of feature points. The facial image is displayed, and the feature points obtained by recognition are displayed on the facial image. The user may adjust the position of any one of the plurality of feature points, to obtain an adjusted facial image, thereby achieving effects of adjusting the position of a certain part of the facial image. The plurality of feature points may include features such as eyes, noses, eyebrows, mouth, or facial contour. The adjustment process may be realized through an operation of dragging feature points by the user.

Figure 3B:
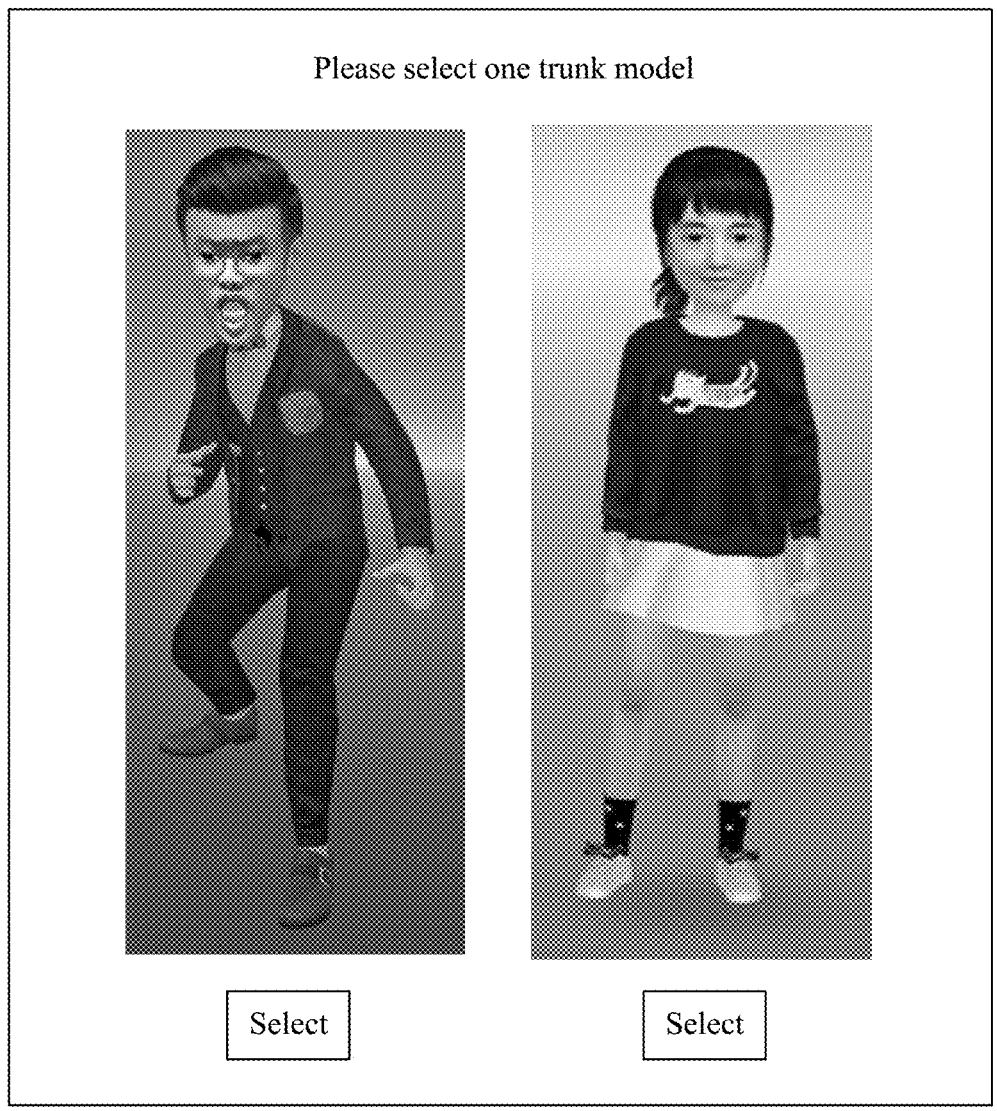
FIG. 3B is a schematic diagram of a trunk model selection interface according to an embodiment of the present disclosure.

The second model may be pre-determined by the terminal, or a plurality of second models may be set in advance. For example, the second model is a trunk model. Various trunk models such as human body models and animal models may be set. The human body models include a male model and a female model, the animal models include a cat model, a dog model, and so on. At this time, the user may select one model as the trunk model used for generating the three-dimensional virtual image. Referring to FIG. 3B, the terminal displays a trunk model selection interface. The trunk model selection interface displays a male model, a female model, and selection buttons of the two models. The user may select a corresponding model by clicking the selection button of any one model.

Alternatively, the terminal may further determine, according to user information, the second model matching the user information. The user information may include material information filled by a user during registration and operation information determined by collecting operation behaviors of the user. For example, the second model is a trunk model, the gender of the user is determined to be female according to the user information, and a female model is selected as a trunk model for generating a three-dimensional virtual image.

Correspondingly, the first model map includes texture data of each pixel point in the first model, and the second model map includes texture data of each pixel point in the second model. A map is a model map for drawing surface texture of a three-dimensional virtual image and may be in a Targa (TGA) format, a Portable Network Graphic (PNG) format, a Tag Image File (TIF) format, or the like. Each pixel point in the map may be accurately corresponding to each pixel point on the surface of the three-dimensional virtual image, and space between pixel points is processed through image smooth interpolation. For example, for a normal map, a three-dimensional vector representing a pixel point normal direction is determined at each pixel point, the three-dimensional vector is stored as values of three colors in RGB (red, green, and blue) and each component is mapped to a range [−1, 1], to determine an RGB value of each pixel point, the normal direction is represented by the RGB value, and then, when the normal map is used for rendering, light and shade changes caused by concave-convex may be represented according to the normal direction of each pixel point, to feel that the three-dimensional virtual image is uneven and improve display effects.

Figure 3C:
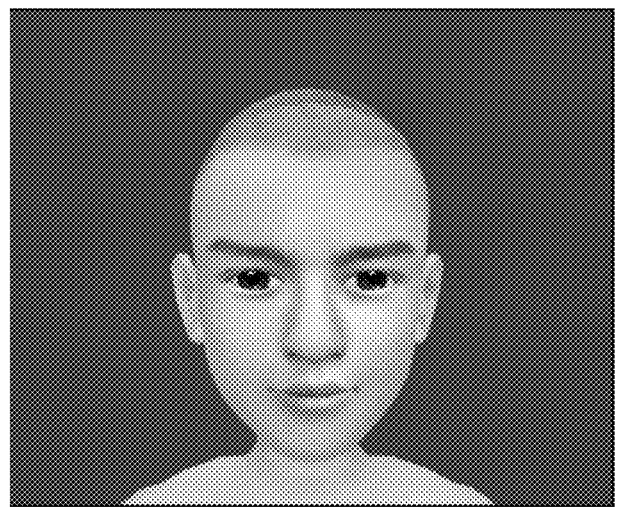
FIG. 3C is a schematic diagram of a three-dimensional model according to an embodiment of the present disclosure.
Figure 3D:
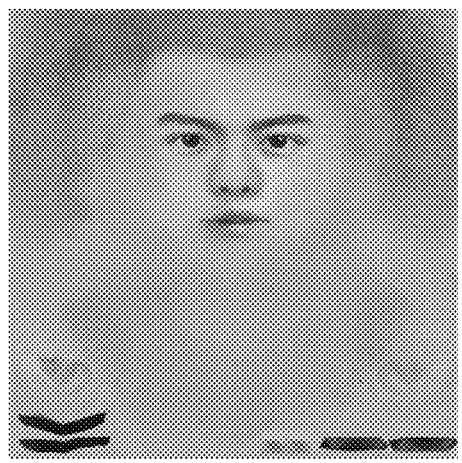
FIG. 3D is a schematic diagram of a two-dimensional picture obtained by displaying a three-dimensional model according to an embodiment of the present disclosure.

Texture of a region where a corresponding pixel point is located may be determined according to texture data of the pixel point. In an implementation, a map may include coordinate data and corresponding texture data of a pixel point. Regarding the manner for determining the coordinate data, referring to FIGS. 3C and 3D, the three-dimensional mode may be expanded to form a two-dimensional picture, pixel points in the two-dimensional picture are one-to-one corresponding to pixel points in the three-dimensional model, a two-dimensional coordinate system is established according to the two-dimensional picture, and coordinate data of each pixel point is determined according to the position of each pixel point in the two-dimensional coordinate system. For example, the coordinate data may be a UV coordinate (the horizontal direction is U and the vertical direction is V).

First, it should be noted that, besides the first model and the second model, the three-dimensional virtual image may further include other image data, for example, ornament information and image beautification information. The ornament information may include cap, scarf, clothes, hair style, and so on, and the image beautification information may include skin whitening, skin grinding, skin color, and so on.

Second, it should be noted that, after receiving the three-dimensional virtual image returned by the server, the terminal may store the three-dimensional virtual image. In subsequent processes, the stored three-dimensional virtual image may be directly read and displayed each time without sending a three-dimensional virtual image generation request to the server again.

302: Determining a target region of the three-dimensional virtual image.

The target region is a joining region of the first model and the second model. In one embodiment of the present disclosure, to solve a seam problem caused by joining of the first model and the second model, a region where a seam is located is determined as the target region.

In a possible implementation, the first model is located above the second model, and a region having a first preset size at a lower edge of the first model and a region having a second preset size at an upper edge of the second model are determined as the target region. The region having the first preset size refers to a region where a lower edge line of the first model is used as a lower edge line of the region, an upper edge line has the same shape as the lower edge line and the height is a first preset height. The region having the second preset size refers to a region where an upper edge line of the second model is used as an upper edge line of the region, the upper edge line has the same shape as a lower edge line and the height is a second preset height. The first preset size and the second preset size may be determined in advance according to accuracy requirements.

Figure 3E:
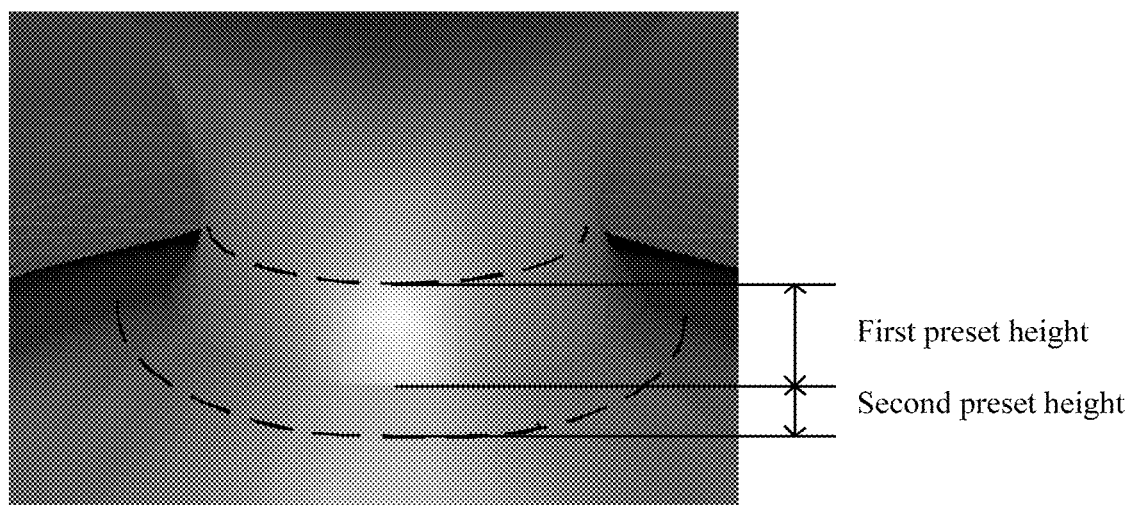
FIG. 3E is a schematic diagram of a target region according to an embodiment of the present disclosure.

The three-dimensional virtual image in FIG. 2 is taken as an example. According to the positions and the shapes of the edges of the first model and the second model in the three-dimensional virtual image, the target region shown in FIG. 3E may be determined (the region between two dotted lines).

303: Setting brightness of each pixel point in the target region in a shader to be the same value.

The shader is used to set illumination environmental data of each pixel point in a three-dimensional virtual image, and by applying the set illumination environmental data to the three-dimensional virtual image, the shader may simulate an effect of illuminating the three-dimensional virtual image from a certain direction under a certain illumination condition, to enhance realness of the three-dimensional virtual image during rendering.

The shader may include a vertex shader, a fragment shader, and so on. Different shaders involve different functions, for example, the vertex shader is used to render a vertex and a model, and the fragment shader is used to render texture of a model surface. The illumination environmental data of the shader at least includes brightness, the brightness is used to represent a brightness degree of a surface of the three-dimensional virtual image, and can describe the brightness felt by an observer when observing the three-dimensional virtual image. In addition, the illumination environmental data of the shader may further include luminous flux, luminous intensity, and so on. The luminous flux refers to light quantity illuminated by a light source in a unit time, and the luminous intensity refers to luminous flux illuminated by a light source in a unit stereo angle in a designated direction.

In one embodiment of the present disclosure, the target region has seams, with a result that a shadow is formed at a position of a neck when the three-dimensional virtual image is displayed and a display effect is influenced. Therefore, to remove the seams in the target region, in one embodiment of the present disclosure, rendering is not performed directly through the shader. Instead, the brightness of each pixel point in the target region in the shader is set to the same value, to ensure that after the three-dimensional virtual image is rendered, the brightness of each point of the displayed target region is equal, and a user may be unable to see shadow when viewing the three-dimensional virtual image.

The terminal may obtain the brightness of each pixel point in the target region, calculate a brightness average value of the target region, and set the brightness of each pixel point in the target region to be the average value. Of course, the brightness value to be set may be determined in other manners.

304: Setting texture data of pixel points in the first model map and the second model map located in the target region to be equal texture data.

In one embodiment of the present disclosure, to ensure that the first model and the second model are transited naturally in the joining region to enhance realness, the terminal further may set texture data of the pixel points of the first model map located in the target region and the texture data of the pixel points of the second model map located in the target region to be equal texture data, to ensure that after the three-dimensional virtual image is rendered, each pixel point in the displayed target region has the same texture.

The terminal may obtain the texture data of each pixel point in the target region, calculate a texture data average value of the target region, and set the texture data of each pixel point in the target region as the average value. Of course, the texture data to be set may be determined in other manners.

It should be noted that, step 304 may be an optional step, and the terminal may not perform step 304 or may perform step 304 to further enhance display effects.

305: Rendering the first model map and the second model map through the shader.

The texture data of each pixel point has been set in the first model map and the second model map, the shader has also set the illumination environmental data of each pixel point, and the three-dimensional virtual image may be displayed through rendering the first model map and the second model map by the shader.

In a possible implementation, the first model map, the second model map, and the illumination environmental data set by the shader are combined and stored together. That is, a material is formed, the material is written into a buffer, and then the material is extracted from the buffer through a renderer to be rendered, to display the three-dimensional virtual image. The shader based on the material may apply a map of a specific material to the three-dimensional virtual image, to implement display of a reflection material object with a surface colored uniformly, so the three-dimensional virtual image looks more real.

According to the method provided according to the embodiments of the present disclosure, a first model map and a second model map of a three-dimensional virtual image are obtained to determine a target region of the three-dimensional virtual image. The brightness of each pixel point in the target region in a shader is set to be equal when the three-dimensional virtual image is displayed, and then rendering is performed, to ensure that brightness of pixel points in the target region is equal and the first model and the second model are transited naturally in the joining region without causing any seam. Thus, this approach may enhance display effects, further satisfy display demand of the three-dimensional virtual image, enhance realness of the three-dimensional virtual image, and bring immersive experience for a user.

Figure 4:
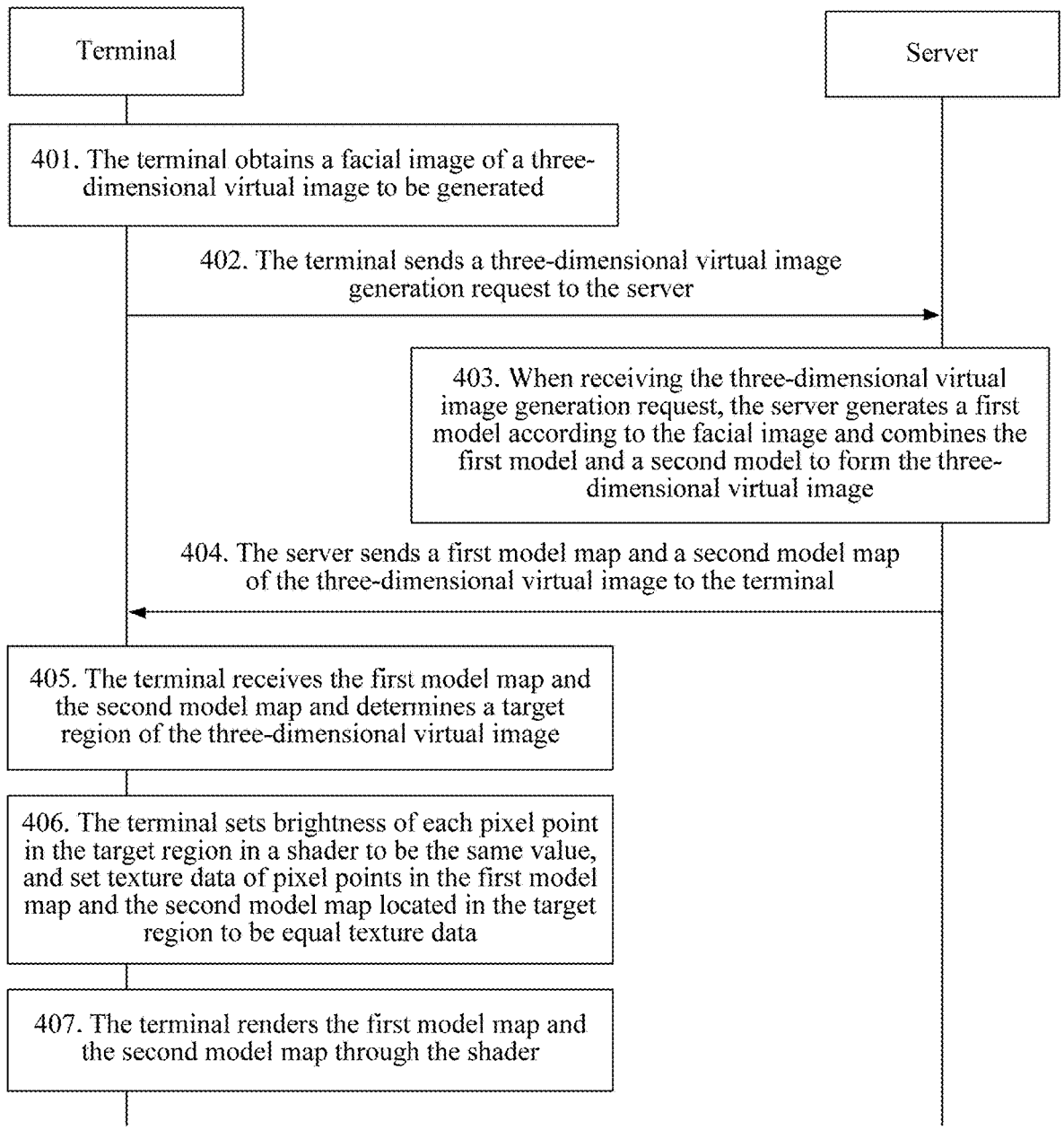
FIG. 4 is a flowchart of another three-dimensional virtual image display method according to an embodiment of the present disclosure.

FIG. 4 is a flowchart of another three-dimensional virtual image display method according to an embodiment of the present disclosure. The execution entity in one embodiment of the present disclosure is the terminal 101 and the server 102 in FIG. 1. Referring to FIG. 4, the method includes the followings.

401: The terminal obtains a facial image of a three-dimensional virtual image to be generated.

402: The terminal sends a three-dimensional virtual image generation request to the server.

In one embodiment of the present disclosure, after obtaining the facial image, the terminal sends the three-dimensional virtual image generation request including the facial image to the server, and the server generates a corresponding three-dimensional virtual image.

The facial image may be obtained by the terminal taking picture of a face of a user or selected from pictures stored in a gallery. Furthermore, after obtaining the facial image, the terminal may further perform beautification processing, for example, adjusting a position where a certain part is located by dragging feature points, and then sends the facial image to the server.

403: After receiving the three-dimensional virtual image generation request, the server generates a first model according to the facial image and combines the first model and a second model to form the three-dimensional virtual image.

404: The server sends a first model map and a second model map of the three-dimensional virtual image to the terminal.

The first model is generated according to the facial image of the user, the second model is pre-determined by the server or the server may provide a plurality of second models for the terminal. The terminal displays the plurality of second models for selection of the user, and when obtaining the second model selected by the user, sends the second model to the server. The server combines the first model and the second model selected by the user to form the three-dimensional virtual image and draws the first model map and the second model map according to the generated three-dimensional virtual image and sends the first model map and the second model map to the terminal.

405: The terminal receives the first model map and the second model map and determines a target region of the three-dimensional virtual image.

406: The terminal sets brightness of each pixel point in the target region in a shader to be the same value, and set texture data of pixel points in the first model map and the second model map located in the target region to be equal texture data.

407: The terminal renders the first model map and the second model map through the shader.

The process in which, after obtaining the first model map and the second model map, the terminal performs rending according to the first model map and the second model map is similar to that in the foregoing embodiment and will not be repeated herein.

According to the method provided according to the embodiments of the present disclosure, a first model map and a second model map of a three-dimensional virtual image are obtained to determine a target region of the three-dimensional virtual image, brightness of each pixel point in the target region in a shader is set to be equal when the three-dimensional virtual image is displayed, and then rendering is performed, to ensure that brightness of pixel points in the target region is equal and the first model and the second model are transited naturally in the joining region without causing any seam, enhancing display effects, further satisfying display demand of the three-dimensional virtual image, enhancing realness of the three-dimensional virtual image, and improving immersive experience for a user.

Figure 5:
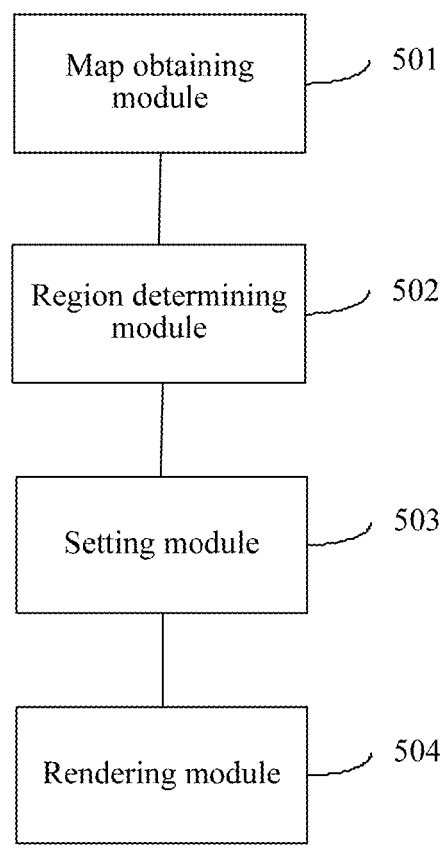
FIG. 5 is a schematic structural diagram of a three-dimensional virtual image display apparatus according to an embodiment of the present disclosure.

FIG. 5 is a schematic structural diagram of a three-dimensional virtual image display apparatus according to an embodiment of the present disclosure. Referring to FIG. 5, the apparatus includes: a map obtaining module 501, a region determining module 502, a setting module 503, and a rendering module 504, etc.

The map obtaining module 501 is configured to perform step 301 in the foregoing embodiment; the region determining module 502 is configured to perform step 302 in the foregoing embodiment; the setting module 503 is configured to perform step 303 in the foregoing embodiment; and the rendering module 504 is configured to perform step 305 in the foregoing embodiment.

Optionally, the apparatus further includes an image obtaining module and a sending module. The image obtaining module is configured to obtain a facial image; and the sending module is configured to send a three-dimensional virtual image generation request to the server.

Optionally, the region determining module 502 is configured to determine a region having a first preset size at a lower edge of the first model and a region having a second preset size at an upper edge of the second model as the target region.

Optionally, a setting module is configured to perform step 304 in the foregoing embodiment.

Optionally, the rendering module 504 is further configured to perform the process of performing rendering through a buffer in step 305.

All optional technical solutions above may be combined in any manner to form optional embodiments of the present disclosure. Details are not repeated herein.

It should be noted that, when the three-dimensional virtual image display apparatus provided in the foregoing embodiments displays a three-dimensional virtual image, it is illustrated with an example of division of the foregoing function modules. In practical applications, the foregoing functions may be distributed to different function modules according to requirements, that is, the internal structure of the terminal is divided into different function modules, so as to finish all or part of the functions described above. In addition, the three-dimensional virtual image display apparatus and method embodiments provided in the foregoing embodiments belong to one conception.

Figure 6:
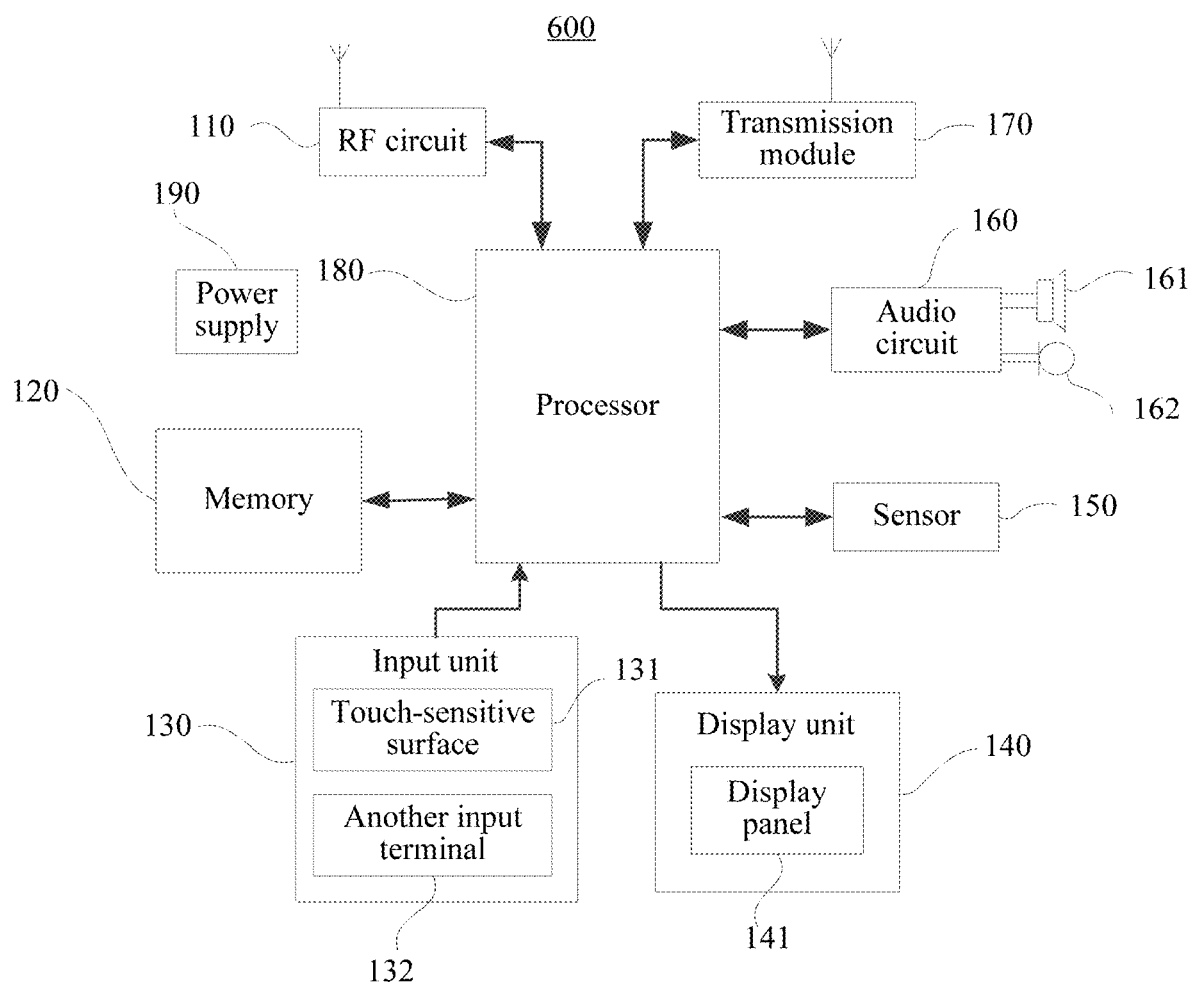
FIG. 6 is a schematic structural diagram of a terminal according to an embodiment of the present disclosure.

FIG. 6 is a schematic structural diagram of a terminal according to an embodiment of the present disclosure. The terminal may be configured to implement the functions performed by the terminal in the three-dimensional virtual image display method in the foregoing embodiments. Specifically:

A terminal 600 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the art may understand that the structure of the terminal shown in FIG. 6 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another terminal by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and a module, for example, a program instruction and a module corresponding to a terminal shown in the foregoing exemplary embodiments, and the processor 180 performs various functional applications and data processing by running the software program and the module stored in the memory 120, for example, implements video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 600, and the like. In addition, the memory 120 may include a high-speed random access memory, and may further include a non-volatile memory such as at least one magnetic disk storage device, a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input terminal 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive a command sent by the processor 180 and execute the command. In addition, the touch-sensitive surface 131 may be a resistive, capacitive, infrared, or surface sound wave type touch-sensitive surface 131. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 600. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of the touch event. Then, the processor 180 provides a corresponding visual output on the display panel 141 according to the type of the touch event. Although, in FIG. 6, the touch-sensitive surface 131 and the display panel 141 are used as two separate parts to implement input and output functions, but in some embodiments, the touch-sensitive surface 131 and the display panel 141 may be integrated to implement the input and output functions.

The terminal 600 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 600 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 600 is not described herein again.

The audio circuit 160, a speaker 161, and a microphone 162 may provide audio interfaces between the user and the terminal 600. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 600.

The terminal 600 may help, by using the transmission module 170, a user to receive and send an email, browse a webpage, and access stream media, and the like, which provides wireless or wired broadband Internet access for the user. Although FIG. 6 shows the transmission module 170, it may be understood that the transmission module 170 is not a necessary component of the terminal 600, and when required, transmission module 170 may be omitted as long as the scope of the essence of the present disclosure is not changed.

The processor 180 is a control center of the terminal 600, is connected to various parts of the entire mobile phone by using various interfaces and lines, and by running or executing a software program and/or module stored in the memory 120 and invoking data stored in the memory 120, perform various functions of the terminal 600 and process data, so as to perform overall monitoring on the mobile phone. Optionally, the processor 180 may include one or more processing cores. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The terminal 600 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more direct current power supplies or alternating current power supplies, a re-charging system, a power failure detection circuit, a power supply converter or inverter, a power supply state indicator, and any other component.

Although not shown in the figure, the terminal 600 may further include a camera, a Bluetooth module, and the like, which are not further described herein. Specifically, in one embodiment, the display unit of the terminal 600 is a touchscreen display, and the terminal 600 further includes a memory and one or more programs, where the one or more programs are stored in the memory, and are configured to be executed by one or more processors, and the one or more programs include instructions for performing the operations performed by the terminal in the foregoing embodiment.

An embodiment of the present disclosure further provides a three-dimensional virtual image display apparatus. The apparatus further includes a processor and a memory. The memory stores at least one instruction, and at least one program, code set or instruction set, and the instruction, program, code set or instruction set is loaded and executed by the processor to implement the operations performed by the three-dimensional virtual image display method in the foregoing embodiment.

An embodiment of the present disclosure further provides a computer readable storage medium. The computer readable storage medium stores at least one instruction, and at least one program, code set or instruction set, and the instruction, program, code set or instruction set is loaded and executed by the processor to implement the operations performed by the three-dimensional virtual image display method in the foregoing embodiment.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A three-dimensional virtual image display method for a terminal, comprising:
    obtaining a first model map and a second model map of a three-dimensional virtual image, wherein the three-dimensional virtual image comprises a first model and a second model, the first model map comprises texture data of each pixel point in the first model, and the second model map comprises texture data of each pixel point in the second model;
    determining a target region of the three-dimensional virtual image, the target region being a joining region of the first model and the second model;
    setting brightness of each pixel point in the target region in a shader to be a same value, the shader being configured to set illumination environmental data of each pixel point in the three-dimensional virtual image and the illumination environmental data at least comprising the brightness; and
    rendering the first model map and the second model map through the shader, so that a brightness of each pixel point in the target region displayed after rendering is equal.

2. The method according to claim 1, wherein the first model is a head model, the second model is a trunk model and, before obtaining a first model map and a second model map of a three-dimensional virtual image, the method further comprises:
    obtaining a facial image; and
    sending a three-dimensional virtual image generation request containing the facial image to a server to cause the server to generate the first model according to the facial image, and to combine the first model and the second model to form the three-dimensional virtual image; and
    receiving the first model map and the second model map of the three-dimensional virtual image from the server.

3. The method according to claim 1, wherein the determining a target region of the three-dimensional virtual image comprises:
    determining a region having a first preset size at a lower edge of the first model and a region having a second preset size at an upper edge of the second model as the target region.

4. The method according to claim 1, before rendering the first model map and the second model map through the shader, further comprising:
    setting texture data of pixel points in the first model map and the second model map located in the target region to be equal, so that texture of each pixel point in the target region displayed after rendering is same.

5. The method according to claim 4, wherein rendering the first model map and the second model map through the shader comprising:
    combining the first model map, the second model map, and the illumination environmental data set by the shader to form a material;
    writing the material into a buffer; and
    rendering the material in the buffer through a renderer.

6. A three-dimensional virtual image display apparatus, comprising:
    a memory storing computer program instructions; and a processor coupled to the memory and, when executing the computer program instructions, configured to perform:

obtaining a first model map and a second model map of a three-dimensional virtual image, wherein the three-dimensional virtual image comprises a first model and a second model, the first model map comprises texture data of each pixel point in the first model, and the second model map comprises texture data of each pixel point in the second model;

determining a target region of the three-dimensional virtual image, the target region being a joining region of the first model and the second model;

setting brightness of each pixel point in the target region in a shader to be a same value, the shader being configured to set illumination environmental data of each pixel point in the three-dimensional virtual image and the illumination environmental data at least comprising the brightness; and rendering the first model map and the second model map through the shader, so that a brightness of each pixel point in the target region displayed after rendering is equal.

7. The apparatus according to claim 6, wherein the first model is a head model, the second model is a trunk model and, before obtaining a first model map and a second model map of a three-dimensional virtual image, the processor is further configured to perform:

obtaining a facial image; and sending a three-dimensional virtual image generation request containing the facial image to a server to cause the server to generate the first model according to the facial image, and to combine the first model and the second model to form the three-dimensional virtual image; and receiving the first model map and the second model map of the three-dimensional virtual image from the server.

8. The apparatus according to claim 6, wherein the determining a target region of the three-dimensional virtual image comprises:

determining a region having a first preset size at a lower edge of the first model and a region having a second preset size at an upper edge of the second model as the target region.

9. The apparatus according to claim 6, wherein, before rendering the first model map and the second model map through the shader, the processor is further configured to perform:

setting texture data of pixel points in the first model map and the second model map located in the target region to be equal, so that texture of each pixel point in the target region displayed after rendering is same.

10. The apparatus according to claim 9, wherein rendering the first model map and the second model map through the shader comprising:

combining the first model map, the second model map, and the illumination environmental data set by the shader to form a material;

writing the material into a buffer; and rendering the material in the buffer through a renderer.

11. A non-transitory computer-readable storage medium storing computer program instructions executable by at least one processor to perform:

obtaining a first model map and a second model map of a three-dimensional virtual image, wherein the three-dimensional virtual image comprises a first model and a second model, the first model map comprises texture data of each pixel point in the first model, and the second model map comprises texture data of each pixel point in the second model;

determining a target region of the three-dimensional virtual image, the target region being a joining region of the first model and the second model;

setting brightness of each pixel point in the target region in a shader to be a same value, the shader being configured to set illumination environmental data of each pixel point in the three-dimensional virtual image and the illumination environmental data at least comprising the brightness; and rendering the first model map and the second model map through the shader, so that a brightness of each pixel point in the target region displayed after rendering is equal.

12. The non-transitory computer-readable storage medium according to claim 11, wherein the first model is a head model, the second model is a trunk model and, before obtaining a first model map and a second model map of a three-dimensional virtual image, the computer program is executable by the processor to further perform:

obtaining a facial image; and sending a three-dimensional virtual image generation request containing the facial image to a server to cause the server to generate the first model according to the facial image, and to combine the first model and the second model to form the three-dimensional virtual image; and receiving the first model map and the second model map of the three-dimensional virtual image from the server.

13. The non-transitory computer-readable storage medium according to claim 11, wherein the determining a target region of the three-dimensional virtual image comprises:

determining a region having a first preset size at a lower edge of the first model and a region having a second preset size at an upper edge of the second model as the target region.

14. The non-transitory computer-readable storage medium according to claim 11, wherein, before rendering the first model map and the second model map through the shader, the computer program is executable by the processor to further perform:

setting texture data of pixel points in the first model map and the second model map located in the target region to be equal, so that texture of each pixel point in the target region displayed after rendering is same.

15. The non-transitory computer-readable storage medium according to claim 14, wherein rendering the first model map and the second model map through the shader comprising:

combining the first model map, the second model map, and the illumination environmental data set by the shader to form a material;

writing the material into a buffer; and rendering the material in the buffer through a renderer.

* * * * *